United States Patent [19]

Lorenzen

[11] Patent Number: 4,992,731
[45] Date of Patent: Feb. 12, 1991

[54] ROTARY SPEED SENSOR WITH BASE LINE COMPENSATION OF HALL CELL OUTPUT SIGNAL

[75] Inventor: David M. Lorenzen, Beacon Falls, Conn.

[73] Assignee: North American Philips Corporation, New York, N.Y.

[21] Appl. No.: 381,614

[22] Filed: Jul. 18, 1989

Related U.S. Application Data

[63] Continuation-in-part of Ser. No. 164,313, Mar. 4, 1988, abandoned.

[51] Int. Cl.⁵ .......................... G01B 7/14; G01P 3/48; G01P 3/54
[52] U.S. Cl. .............................. 324/174; 324/207.12; 324/207.2; 324/207.25; 307/309; 338/32 H
[58] Field of Search ................... 324/173, 174, 207.11, 324/207.12, 207.13, 207.20, 207.21, 225, 235, 251, 252; 338/32 H, 32 R; 307/309

[56] References Cited

U.S. PATENT DOCUMENTS 4,293,814 10/1981 Boyer ............................... 324/207.2
4,481,469 11/1984 Hauler et al. ..................... 324/174

Primary Examiner—Walter E. Snow
Attorney, Agent, or Firm—Jack D. Slobod; Jack E. Haken

[57] ABSTRACT

A rotary speed sensor system uses a permanent magnet and a Hall cell sensitive to the changing tangential component of magnetic field caused by the interrupted surface profile of a rotary element. In order to avoid anomalies caused by the variation of the base value of the tangential component of magnetic field, the output of a differential amplifier fed by the Hall cell is connected to a voltage averaging circuit which stores the average voltage of the output on a single capacitor. The output of the differential amplifier and the voltage across the capacitor are respectively coupled to the differential inputs of a Schmitt trigger exhibiting hysteresis. The Schmitt trigger thereby establishes operate and release points relative to the average voltage signal. The voltage averaging circuit is a non-linear circuit in which the voltage across the capacitor is fed back to the negative input of an operational amplifier. A power-up circuit is also provided for rapidly charging the capacitor initially to approximately the average voltage.

10 Claims, 6 Drawing Sheets

ROTARY SPEED SENSOR WITH BASE LINE COMPENSATION OF HALL CELL OUTPUT SIGNAL

RELATED APPLICATION

This is a continuation-in-part of Ser. No. 164,313, filed March 4, 1988 and now abandoned.

BACKGROUND OF THE INVENTION

The present invention relates to a rotary speed sensor having a Hall element responsive to the changing tangential component of a magnetic field, and more particularly to such a sensor with a digital output signal.

U.S. Pat. No. 4,481,469 discloses a rotary speed sensor system for a rotary element of ferrous material which is rotatable about an axis of rotation and has a cross-section, perpendicular to the axis, which exhibits an interrupted surface profile. The sensor includes a magnet generating a magnetic field which includes the rotary element, the field exhibiting both radial and tangential components relative to the rotary element; the tangential component changes as the interrupted surface profile passes in proximity to the magnet. A Hall element in the magnetic field between the magnet and the rotary element has a voltage output responsive to the changing tangential component of the magnetic field, the voltage output being substantially sinusoidal. The sensor further includes circuitry having switching for converting the sinusoidal voltage output to a digital voltage output. The switching has a release point below a first voltage which corresponds to a first field strength and an operating point above a second voltage which corresponds to a second field strength, the second voltage being greater than the first voltage.

When the rotary element or target is a gear, as shown in U.S. Pat. No. 4,481,469, the voltage corresponding to the tangential component of the magnetic field will be a continuous sinusoid. If the rotary element or target is a wheel with one or more spaced apart slots in its surface, the voltage will be flat but for a sinusoidal pulse as each slot passes the sensor. For an ideal magnet having a magnetic field of perfect symmetry and a Hall element perfectly centered relative thereto, the tangential component of the magnetic field at the situs of the Hall element should be zero in the absence of any ferrous material in the field or when the lines of flux on opposed sides of the Hall element extend symmetrically toward the ferrous material, as when the element is aligned with the center line of a gear tooth or the uninterrupted surface of a wheel.

FIG. 1 illustrates a wheel 10 rotating about axis 11 and having an interrupted surface in the form of a slot 12. A permanent magnet 14 has a polar end 15 facing the wheel 10, and a Hall sensor 16 inset in the center of polar end 15. The sensor 16 includes a Hall element transducer which is substantially coplanar with the axis 11, so that the tangential component of the magnetic field will ideally be zero when the Hall element is adjacent the uninterrupted surface of the wheel remote from slot 12, or centered over slot 12.

FIG. 2 illustrates the variation in the tangential component of the magnetic field as the slot passes the sensor. The solid line shows the field when the air gap between the Hall element and the wheel surface is minimal and the dashed line shows the tangential field component for a relatively large gap. The Hall element translates this varying field to a varying voltage of like profile, which will then be amplified to useful values and used for switching.

A problem arises in prior art sensors due to the non-uniform nature of typical magnets; the magnetic fields seldom emanate from the polar ends thereof with perfect symmetry. Thus, a magnet which is not specially selected cannot be relied upon to yield a tangential field component of zero at the location of the Hall element, when the Hall element is opposite the wheel surface remote from the interrupted portion. Also, misalignment of the Hall element relative to the magnet or tilting of the sensor system relative to the target causes the average or base tangential field component upon which the slot responsive sinusoidal pulse is superimposed to vary, particularly from unit to unit and over the long term.

Circuitry associated with known Hall sensors is shown schematically in FIG. 4. The Schmitt trigger generates an output of constant amplitude which exists only as long as the input voltage exceeds a certain value. When the input voltage falls below that value (the release point), the output changes amplitude. The output will not return to its original amplitude until the input voltage exceeds a certain value (the operate point) which is higher than the release point. The Schmitt trigger may thus be considered as a comparator with hysteresis; it converts an analog input voltage to a digital output voltage having two levels, "0" and "1". By use of a NPN transistor in the output, the voltage amplitudes corresponding to these levels can be modified to desired voltage levels utilizing, for example, a pull-up resistor (not shown) for the open collector of the transistor. However, for a given circuit, the operate and release points of the Schmitt trigger are fixed. The duration, or even occurrence, of a slot responsive pulse in the digital output voltage is thus dependent on the voltage corresponding to the average or base tangential field component of the magnetic field seen by the Hall sensor when positioned over the uninterrupted portion of the wheel surface.

FIGS. 3A–3E illustrate how the digital output voltage is affected by the signal voltage $V_{sig}$ at the input of the Schmitt trigger relative to the operate and release points $V_{op}$ and $V_{rel}$ respectively. FIG. 3A illustrates the situation where the signal voltage at the input is substantially the same as the average of the operate and release points. This is considered ideal, since variations in the air gap which affect the magnitude of the sinusoidal pulse at the input of the Schmitt trigger will not substantially affect the digital output pulse. FIG. 3B depicts the analog and digital outputs for a speed sensor system having a magnet with an average tangential field component producing an average voltage less than the release point to such an extent that the peak voltage of the sinusoidal pulse is not sufficient to exceed the operate point of the trigger. As a result, the digital output remains constant at the "1" level. A "worst case" magnet can yield such a result. With an average tangential field component producing an average voltage less than, but closer to, the release point (FIG. 3C), there is produced a pulse of shortened duration and of opposite sense to the pulse produced in FIG. 3A. However, a slight increase in the air gap will cause the peak voltage to fall short of the operating voltage, causing the digital output to become flat as in FIG. 3B. FIGS. 3D and 3E depict the analog and digital outputs for speed sensor systems with magnets having average tangential field strengths producing average voltages which exceed the operating point to a greater and to a lesser extent respectively. This produces further anomalous results.

U.S. Pat. No. 4,293,814 discloses a crankshaft position sensor which utilities a Hall element whose output depends on the radial component of flux in a magnetic field. The direction of the field is influenced by an actuator having uniformly spaced radially extending sections resembling large gear teeth so that a generally square wave is produced. High voltage peaks are stored on a first capacitor and low voltage peaks are stored on a second capacitor; a comparator triggered at a self-adjusting threshold value between peaks provides an output signal whose waveform will have a constant amplitude without regard to peak variations of the input signal.

The system described in U.S. Pat. No. 4,293,814 is only suitable for wheels having large, uniformly spaced teeth. In the case of a slotted wheel, the low peak only occurs for a short period while the high peak occurs for a relatively long period. Since the capacitor is discharged with a finite time constant, the low peak drifts upward If the time period is long enough (low RPM) the threshold may be reached before the slot arrives, so that the comparator is triggered prematurely.

Another problem associated with using the radial flux component is that the sensor is sensitive to run-out, that is, the effect of changing minimum or maximum air gap about the circumference of the rotary element, which could be caused by eccentricity. The threshold voltage could be reached sooner or later than desired, so that the circuitry would have to be desensitized to run-out, reducing the air gap for which the sensor is useful.

SUMMARY OF THE INVENTION

It is the object of the invention to provide a rotary speed sensor system wherein the profile of the digital output voltage is substantially unaffected by variations in the average or base tangential component of the magnetic field as seen by the Hall element.

According to the invention, the speed sensor system has circuitry which further includes voltage averaging means for simultaneously adjusting the release and operate points so that the average thereof at least substantially corresponds to the average or base tangential field component of the magnetic field seen by the Hall element. By so positioning the release and operate points, the inventive speed sensor system yields a digital output voltage substantially as shown in FIG. 3A in every case. Slight differences (e.g. from unit to unit) in the air gap between the Hall element and the rotary element may vary the amplitude of the analog pulse, but the digital output will not be substantially effected.

This positioning of the release and operate points relative to a voltage corresponding to the average or base tangential field component is established by feeding one input of a Schmitt trigger with the amplified differential output of the Hall cell and feeding another input of the Schmitt trigger with the output of a voltage averager responsive to the amplified output of the Hall cell. The Schmitt trigger thus compares the voltage corresponding to the average magnetic field with the amplified output of the Hall cell, assuring that triggering will occur consistently notwithstanding variations in the orientation and position of the Hall cell and in the magnetic fields established. Thus, the inventive system eliminates the need for culling out magnets with asymmetric fields or tuning the circuitry to match the magnet in every system produced.

Another feature of the invention is that it is suitable for operation at low RPM such as 10 RPM or less and is suitable for high temperature operation such as 150° C. as may be required for operation with an automotive engine. Since the leakage resistance associated with a relatively large value capacitor at such temperatures will cause the capacitor to discharge by leaking current with a significantly rapid time constant, it is necessary when using a capacitor to hold the average voltage to supply the demanded leakage current preventing unwanted discharge.

Still a further feature of the invention is the provision of means for power-up initialization of the voltage averager.

Another advantage of using the tangential component of the magnetic field is that it is not sensitive to run-out. In the case of a slotted wheel eccentrically mounted, the average tangential component of field strength will not change appreciably as the non-slotted portion of the wheel's surface passes the Hall element Thus, desensitization (reducing the differential between release and operating points) is not necessary, and the useful range of air gaps is not reduced.

BRIEF DESCRIPTION OF THE DRAWINGS

Other objects, features, and advantages of the present invention will become apparent from the following detailed description of the preferred embodiment when taken in conjunction with the appended drawing wherein.

DETAILED DESCRIPTION OF THE PREFERRED EMBODIMENT

Figure 1:
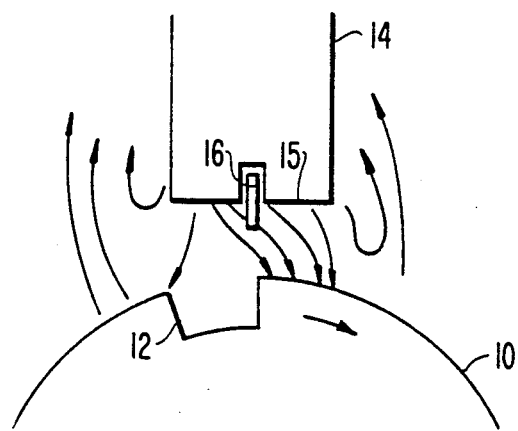
FIG. 1 is a schematic of a rotary speed sensor using a Hall cell.
Figure 2:
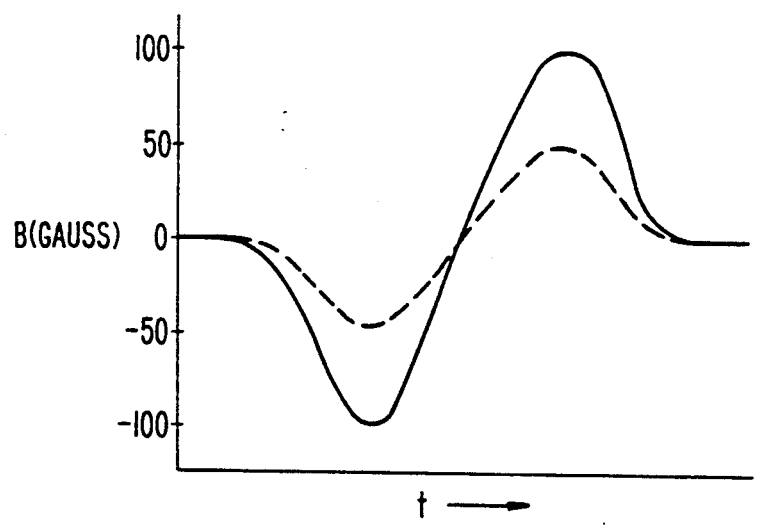
FIG. 2 is a graph of the tangential component of the magnetic field versus time for an ideal magnet.
Figure 3A:
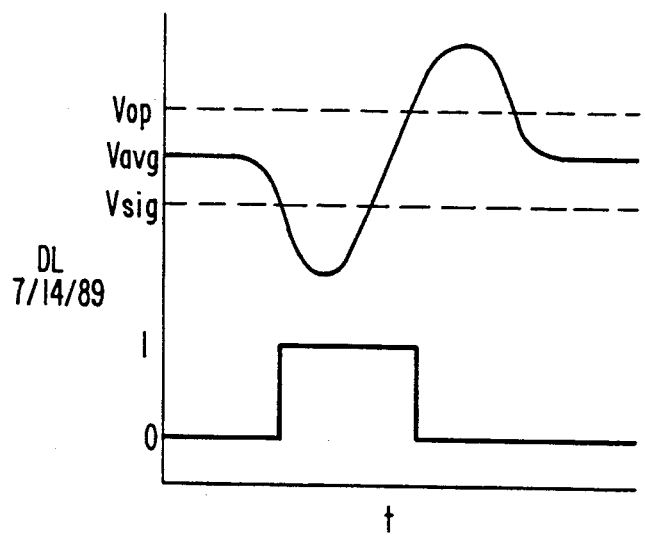
FIGS. 3A–3E are schematic graphs illustrating the voltage output of the Hall cell relative to the trip points of associated circuitry as well as digital voltage outputs resulting therefrom for the different magnets.
Figure 3B:
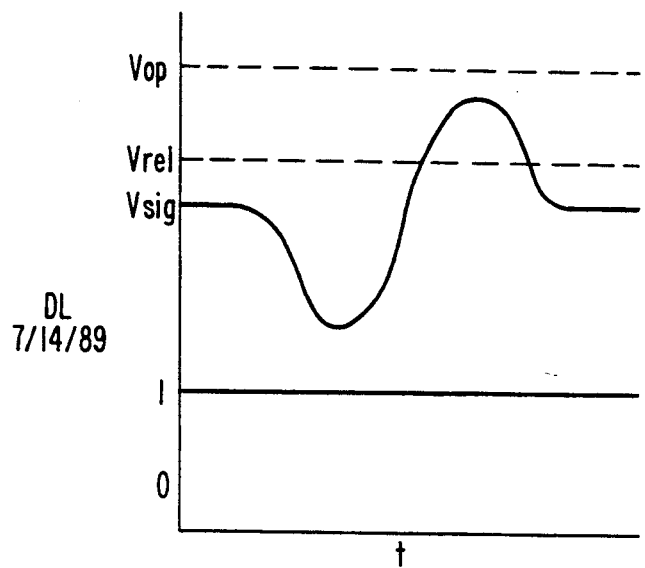
Figure 3C:
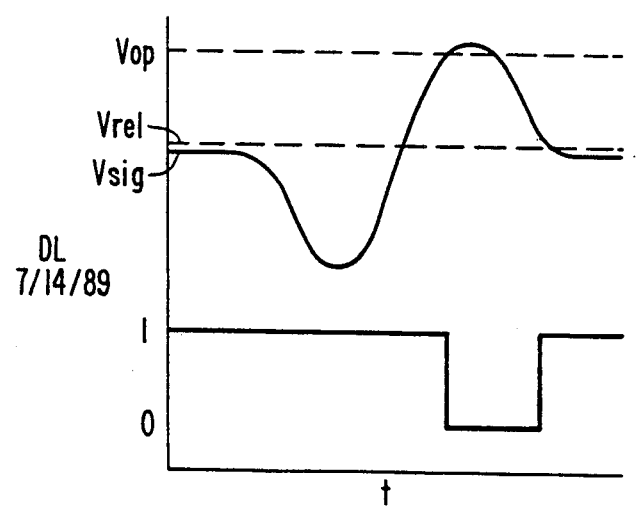
Figure 3D:
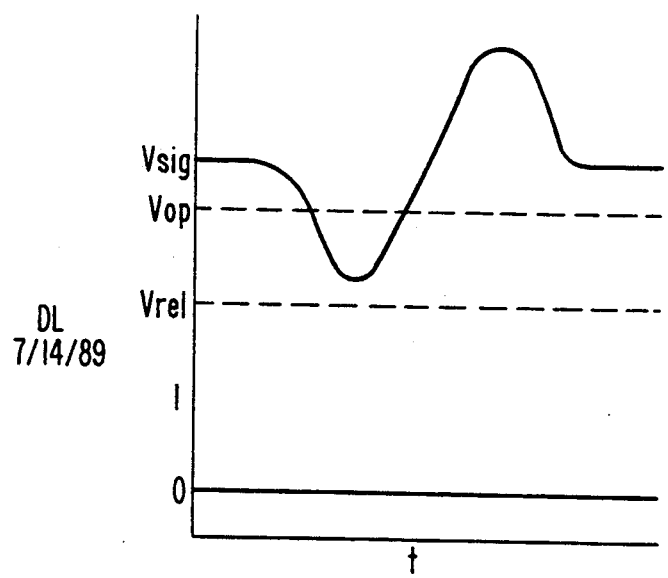
Figure 3E:
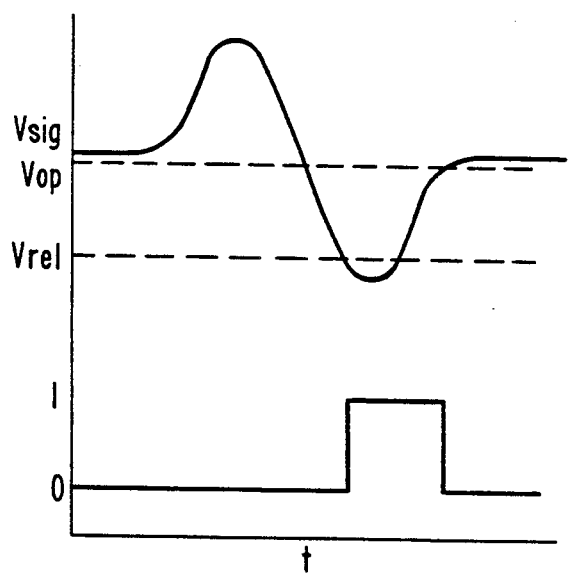
Figure 4:
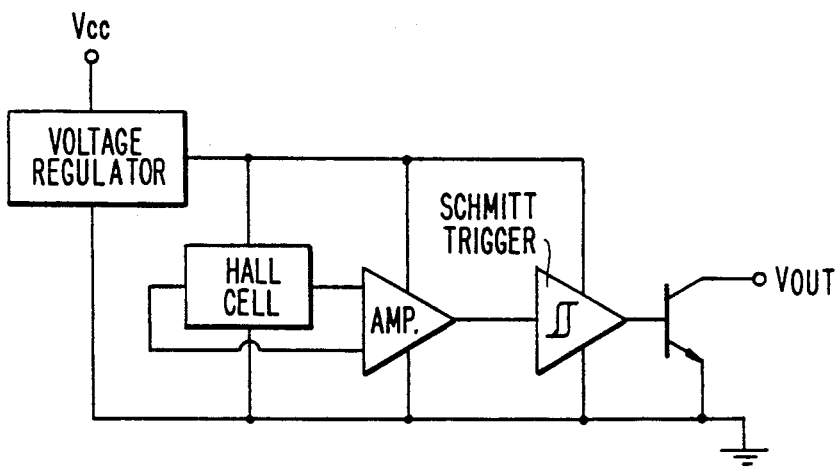
FIG. 4 is a schematic of the prior art Hall switch circuit.
Figure 5:
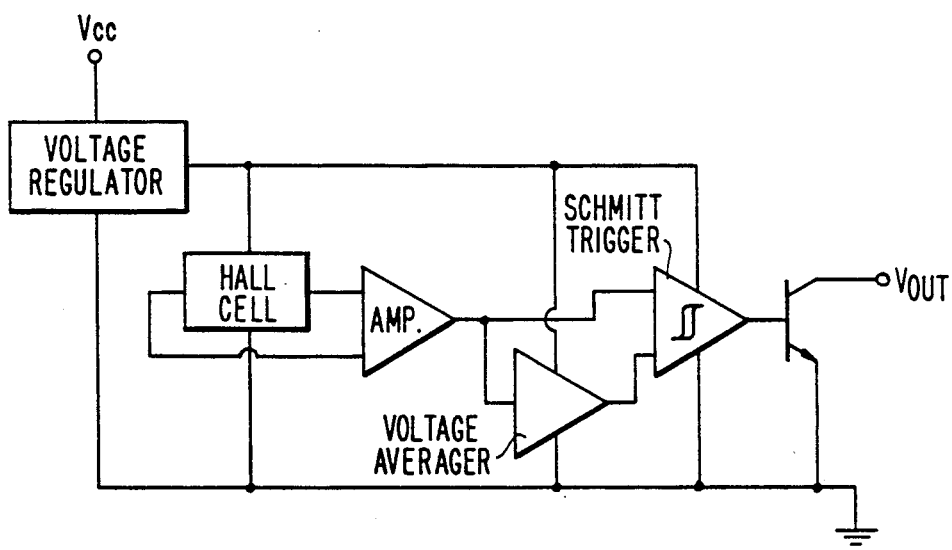
FIG. 5 is a schematic of the basic self-adjusting Hall switch circuit.
Figure 6:
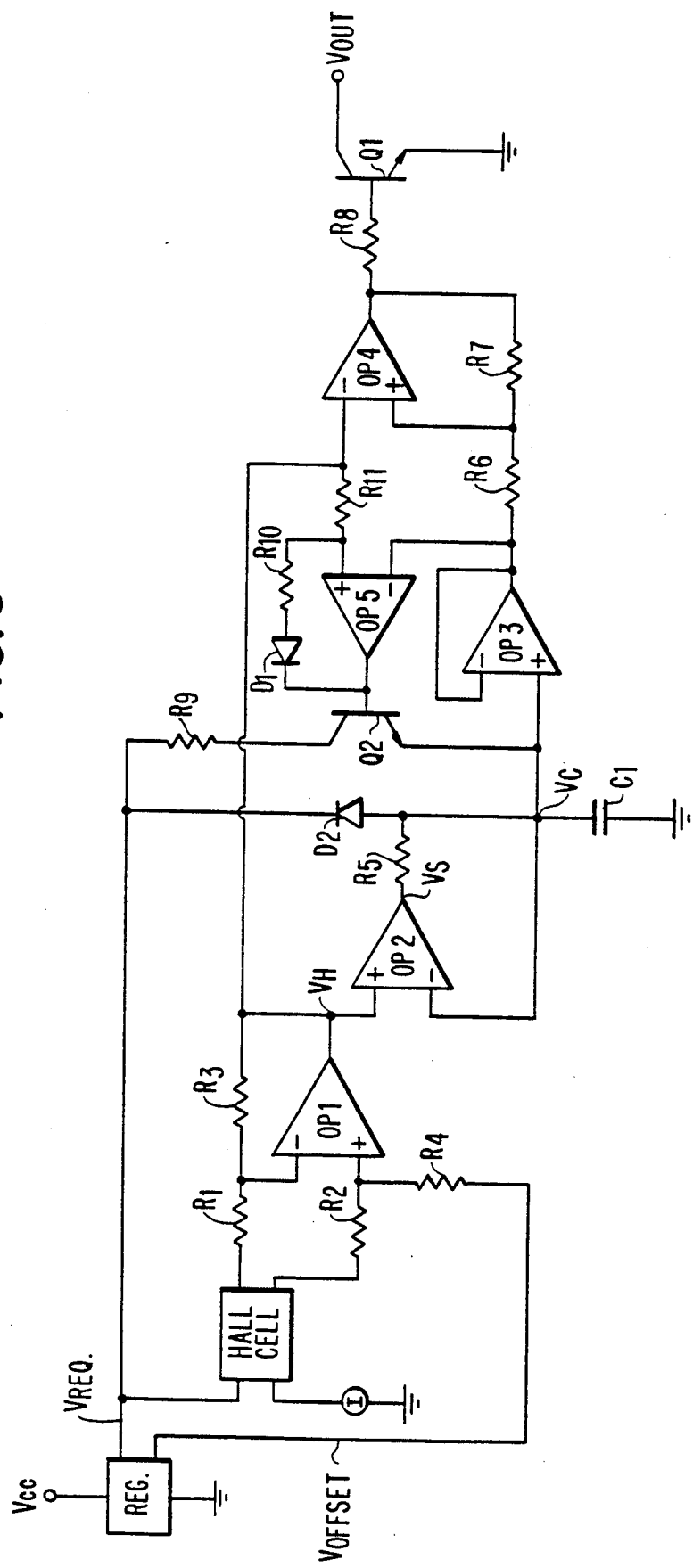
FIG. 6 is a schematic of the preferred self-adjusting Hall switch circuit.
Figure 7A:
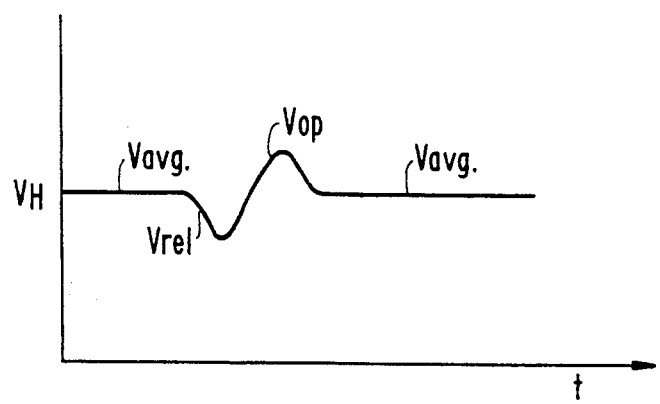
FIGS. 7A-7D are corresponding graphs illustrating various voltages in FIG. 6 as a function of time.

FIG. 6 shows a preferred embodiment of the circuit used in the he inventive rotary speed sensor system. A voltage regulator provides a voltage $V_{reg}$, preferably about four volts, to the Hall cell independent of the supply voltage $V_{cc}$. I is a current source that keeps the current in the Hall cell constant over temperature. The Hall cell outputs an analog voltage differential proportional to the tangential component of the applied magnetic field, which voltage differential varies generally in the form of a sinusoidal pulse as a discontinuity of the ferrous rotary element passes the Hall cell Resistors $R_1$, $R_2$, $R_3$ and $R_4$ and first operational amplifier OP1 form a differential amplifier, the resistors being chosen so that $R_1 \cdot R_4$ equals $R_2 \cdot R_3$. Furthermore, an offset voltage $V_{offset}$ is provided, as from the voltage regulator, having a voltage of about one-half $V_{reg}$, and is coupled to $R_4$. The provision of $V_{offset}$ biases output $V_H$ (FIG. 7A) to be an always positive signal which varies as the tangential component of magnetic field strength.

Voltage $V_H$ is applied to the first or positive input of second operational amplifier OP2. OP2, $R_5$, and C1 form a type of voltage averager which closely maintains the base value of $V_H$, herein referred to a $V_{avg}$, as the voltage $V_C$ across capacitor C1.

Figure 7B:
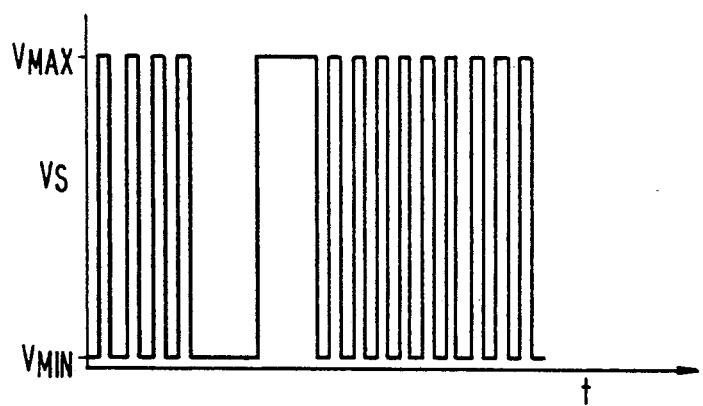
Figure 7C:
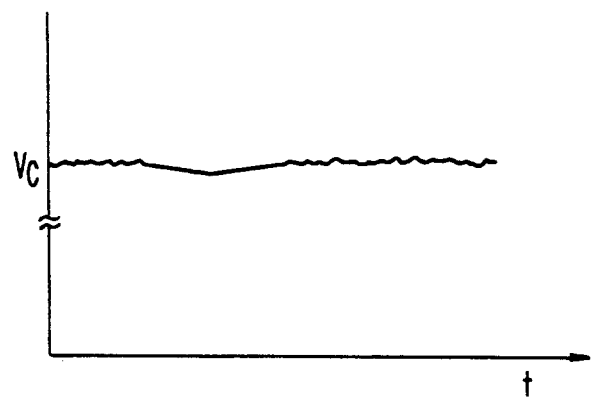

It should be appreciated that a linear RC circuit is not suitable for averaging $V_H$ because of the large time constant, in the range of 0.1 to 50 seconds necessary to average over several slow rotations of the wheel (e.g. at 1–500 RPM) and the typical high temperature environment of the speed sensor (e.g. 150° C.) when in association with an internal combustion engine. At such temperatures, a large value capacitor, such as 1 micro farad, will exhibit a leakage resistance of as low as 20 meg ohms. Thus, if a large time constant is desired, such as 10 seconds, by the series combination of a 10 meg ohm resistor and a 1 micro farad capacitor, the inherent leakage resistance shunting the capacitor will form a voltage divider with the 10 meg ohm resistor significantly reducing the voltage across the capacitor. In order to avoid these difficulties, the voltage averager is formed by a non-linear circuit in which the voltage $V_C$ across capacitor C1 is fed back to the negative input of OP2 and the output voltage $V_S$ of OP2 is applied to the capacitor via a resistor $R_5$. C1 is in the range of 0.1 to 10 micro farads and $R_5$ is in the range of 1 to 5 meg ohm. The operation of this circuit will be best understood by reference to FIGS. 7A –7C. It should be understood that because $V_C$ cannot change instantaneously, $V_S$ will normally oscillate between its upper and lower saturation levels, $V_{MAX}$ and $V_{MIN}$ ($V_{MIN}$ being approximately zero), alternately sourcing current into and sinking current from capacitor C1. This action causes $V_C$ to slew an insignificant amount above and below the base voltage $V_{avg}$ which base voltage will be approximately one-half $V_{MAX}$. More time may be spent by OP2 at the upper saturation level $V_{MAX}$ than the lower saturation level $V_{MIN}$ in order to supply, on the average, the leakage current demanded by the inherent leakage resistance of C1 at $V_{avg}$. Furthermore, $V_C$ can track $V_{avg}$ as long as the base voltage changes more slowly than the slew rate. The maximum slew rate of $V_C$ due to the sourcing or sinking action, determined approximately by $V_{MAX}/2 \cdot R_5 C1$, is chosen sufficiently small (such as in the range of 0.04 to 20 volts per second), that the variation of $V_C$ during the slot responsive pulse is not significant.

$V_C$ is applied to the first or positive input terminal of third operational amplifier OP3 which is wired as a voltage buffer. As a result of the connection of its output to its second or negative input terminal, the output of OP3 follows $V_C$ without loading C1.

Figure 7D:
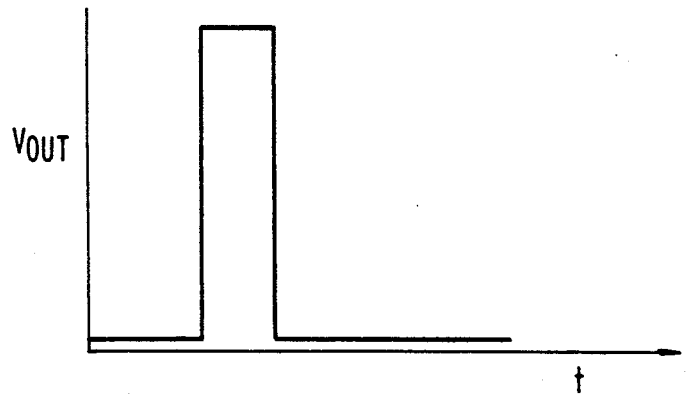

The Schmitt trigger is formed by a fourth operational amplifier OP4 which receives $V_H$ at its negative input terminal and has its positive input terminal coupled to the output of OP3 via $R_6$ and to its own output via $R_7$. In effect, OP4 operates as a comparator between $V_H$ and the voltage at its negative input terminal. $R_6$ and $R_7$ cause the necessary hysteresis at the positive input terminal of OP4 about the output of OP3, setting the proper operate and release points for $V_H$. As a result, the output of OP4 will go low during the time period beginning when $V_H$ passes downwardly through $V_{rel}$ and ending when $V_H$ passes upwardly through $V_{op}$. This low voltage at the output of OP4 cuts off NPN transistor Q1 producing the positive output pulse $V_{OUT}$ illustrated in FIG. 7D.

As a result of the necessary limitation of the slew rate of $V_C$ during normal operation, $V_C$ on turn-on or power-up of the apparatus, will take an excessive time to reach $V_{avg}$. In order to improve start-up, an initialization circuit is provided comprising operational amplifier OP5, wired as a comparator with hysteresis in one direction, and an NPN transistor Q2 having its collector coupled to $V_{reg}$ via a relatively low valve resistor $R_9$, its emitter coupled to the junction of $R_5$ and C1 and its base connected to the output of OP5. OP5 has its negative input terminal connected to the output of OP3, and its positive input terminal connected to $V_H$ via a resistor $R_{11}$ and coupled to its own output via the series combination of a resistor $R_{10}$ and a diode D1.

On turn-on, $V_C$ and the output of OP3 are zero while $V_H$ is positive. This will cause the output of OP5 to go high cutting off D1, turning on Q2, and thereby causing current flow relatively rapidly charging C1 from $V_{reg}$ via $R_9$. When $V_C$, as indicated by the output of OP3, just exceeds $V_H$, OP5 will go low cutting off Q2 and putting D1 into conduction. When D1 conducts, it causes a hysteresis characteristic in association with $R_{10}$ and $R_{11}$. Optimally, $R_{10}$ and $R_{11}$ are chosen to cause sufficient hysteresis that the output of OP5 does not again go high in response to the positive-going portion of the slot responsive pulse in $V_H$.

Additionally, a diode D2 is preferably provided between $V_{reg}$ and the junction of $R_5$ and C1 directed so as to be reverse biased. The purpose of D2 is to supply the leakage current which would otherwise leak from C1 in a number of paths most significantly the leakage current path through the reverse-biased base-emitter junction of Q2.

While the invention has herein been described in specific detail, it should be apparent that numerous modifications, additions and omissions are possible within the intended spirit and scope of the invention.

What is claimed is:

1. A rotary speed sensor system for use with a rotary element of ferrous material rotatable about an axis of rotation and having a cross-section, perpendicular to said axis of rotation, which exhibits a surface interruption, and magnet means generating a magnetic field along a magnetic path which includes said rotary element, said magnetic field having a component characterized by a base field subject to relatively slow variation, on which base field is superimposed a relatively rapid field variation in response to said surface interruption passing in proximity to said magnet means, the rotary speed sensor comprising:

transducer means to be positioned in said magnetic path for detecting the instantaneous amplitude of said magnetic field component; and circuit means responsive to said transducer means for detecting the occurrences of said relatively rapid field variation notwithstanding the relatively slow variation of said base field, said circuit means comprising:

a first trigger means having first and second differential inputs and an output for forming the output of said circuit means;

a first amplifier means fed by said transducer means and having an output coupled to the first input of said trigger means for carrying a signal indicative of the instantaneous tangential component of said magnetic field; and averaging means interposed between the output of said first amplifier means and the second input of said trigger means for providing a reference signal indicative of the amplitude of said base field, said averaging means comprising:

a second amplifier means having first and second differential inputs and an output for said reference voltage coupled to the second input of said first trigger means; the first input of said second amplifier means being coupled to the output of said first amplifier means; and a capacitor connected between the output of said second amplifier means and a point of constant voltage for storing a voltage indicative of said reference voltage, the second input of said second amplifier means and the output of said second amplifier means being connected to each other.

whereby the voltage of said capacitor is maintained by said second amplifier means notwithstanding an inherent leakage characteristic of said capacitor.

2. A rotary speed sensor system as claimed in claim 1, wherein said second amplifier means is configured to selectively source current into or sink current from said capacitor in an amount sufficiently large to allow the reference voltage at the output of said second amplifier means to follow a relatively slow variation of the output signal of the first amplifier means due to the base field variation while not being so large as to substantially respond to a relatively rapid variation in the output signal of the first amplifier means due to the said surface interruption passing in proximity to said magnet means.

3. A rotary speed sensor system as in claim 2, comprising initialization means coupled to said capacitor for sourcing current into said capacitor in a relatively larger amount than could be sourced by said second amplifier means for initially bringing the reference voltage to a value indicative of an amplitude proximate the amplitude of said base field.

4. A rotary speed sensor system as claimed in claim 3, wherein said initialization means comprises a transistor switch means in series with said capacitor.

5. A rotary speed sensor system as claimed in claim 4, further comprising a second trigger means having an output controlling said transistor switch means and having first and second differential inputs, the output of said second amplifier means being coupled to the first input of said second trigger means and the output of the first amplifier means being coupled to the second input of said second trigger means, said second trigger means being configured to turn off said transistor switch means upon the reference voltage output of said second amplifier means first substantially reaching a value indicative of the amplitude of said base field.

6. A rotary speed sensor system as claimed in claim 5, wherein said second trigger means has a unidirectional hysteresis characteristic, such that the hysteresis substantially prevents said transistor switch means from being turned on after it has been turned off by said initialization means.

7. A rotary speed sensor system as claimed in claim 5, further comprising a reverse-biased diode coupled between said capacitor and a source supply voltage for substantially sourcing a demand for leakage current from said capacitor.

8. A rotary speed sensor as claimed in claim 1, further comprising third amplifier means coupled between said output of said second amplifier means and said first input of said first trigger means.

9. A rotary speed sensor system as claimed in claim 8, wherein said first trigger means comprises fourth amplifier means having first and second inputs and an output, said first input of said fourth amplifier means being coupled to said output of said first amplifier means, said second input of said fourth amplifier means being coupled through a first resistor to the output of the third amplifier means and a second resistor being coupled between the second input and the output of the fourth amplifier means, said first and second resistors providing a hysteresis characteristic to said fourth amplifier means.

10. A rotary speed sensor system as claimed in claim 9, wherein said circuit means further comprises a transistor switch means controlled by the output of said first trigger means.

* * * * *